United States Patent
Park et al.

(10) Patent No.: US 10,814,877 B2
(45) Date of Patent: Oct. 27, 2020

(54) INTEGRATED CONTROL METHOD AND INTEGRATED CONTROLLER OF POWERTRAIN

(71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Sang-Jun Park, Seoul (KR); Byeong-Wook Jeon, Seoul (KR); Myoung-Ho Sunwoo, Seoul (KR); Dong-Won Jeoung, Suwon-si (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 68 days.

(21) Appl. No.: 16/165,963

(22) Filed: Oct. 19, 2018

(65) Prior Publication Data
US 2019/0291736 A1 Sep. 26, 2019

(30) Foreign Application Priority Data
Mar. 26, 2018 (KR) .................. 10-2018-0034644

(51) Int. Cl.
*B60W 10/06* (2006.01)
*B60W 10/10* (2012.01)
*B60W 30/188* (2012.01)

(52) U.S. Cl.
CPC ........ *B60W 30/1882* (2013.01); *B60W 10/06* (2013.01); *B60W 10/10* (2013.01);
(Continued)

(58) Field of Classification Search
CPC .. B60W 10/06; B60W 10/10; B60W 30/1882; B60W 2050/001;
(Continued)

(56) References Cited

U.S. PATENT DOCUMENTS

| 6,436,005 | B1* | 8/2002 | Bellinger | B60W 10/06 |
| | | | | 477/110 |
| 6,546,329 | B2* | 4/2003 | Bellinger | B60W 10/06 |
| | | | | 123/478 |

(Continued)

FOREIGN PATENT DOCUMENTS

| EP | 1 045 121 A2 | 10/2000 |
| JP | 2001-355477 A | 12/2001 |

(Continued)

OTHER PUBLICATIONS

Daekyun Kim et al., "Control of Integrated Powertrain With Electronic Throttle and Automatic Transmission," IEEE Transactions on Control Systems Technology, May 2007, pp. 474-482, vol. 15, No. 3.

*Primary Examiner* — David R Morris
(74) *Attorney, Agent, or Firm* — Morgan, Lewis & Bockius LLP

(57) ABSTRACT

An integrated controller of a powertrain of a vehicle and a control method thereof, to determine an optimum shifting stage of the vehicle, may include a cost function having a driving distance per fuel consumption amount obtained through the simulation of a vehicle model by use of the demand power of the engine as an input value, wherein an optimum shifting stage is determined using the cost function to control an engine throttle in addition to controlling a transmission based on the optimum shifting stage.

15 Claims, 13 Drawing Sheets

(52) U.S. Cl.
CPC ............... *B60W 2510/0638* (2013.01); *B60W 2510/1005* (2013.01); *B60W 2520/10* (2013.01); *B60W 2540/10* (2013.01); *B60W 2710/0605* (2013.01); *B60W 2710/1005* (2013.01)

(58) Field of Classification Search
CPC . B60W 2510/0638; B60W 2510/1005; B60W 2520/10; B60W 2540/10; B60W 2710/0605; B60W 2710/1005
See application file for complete search history.

(56) References Cited

U.S. PATENT DOCUMENTS

| | | | | |
|---|---|---|---|---|
| 6,944,532 | B2* | 9/2005 | Bellinger | B60W 10/06 123/350 |
| 6,957,139 | B2* | 10/2005 | Bellinger | B60W 10/06 477/111 |
| 7,801,654 | B2* | 9/2010 | Bai | B60W 10/10 701/54 |
| 9,701,303 | B2* | 7/2017 | Yang | B60W 20/30 |
| 10,059,341 | B2* | 8/2018 | Sharp | B60W 10/06 |
| 2002/0132699 | A1* | 9/2002 | Bellinger | B60W 10/06 477/107 |
| 2004/0002806 | A1* | 1/2004 | Bellinger | B60W 10/06 701/104 |
| 2008/0281494 | A1 | 11/2008 | Bai | |
| 2013/0325335 | A1* | 12/2013 | Kee | G01C 21/3469 701/527 |
| 2014/0236457 | A1 | 8/2014 | Chen et al. | |
| 2015/0367840 | A1* | 12/2015 | Yang | B60W 20/30 701/22 |
| 2017/0361845 | A1* | 12/2017 | Sharp | B60W 10/06 |

FOREIGN PATENT DOCUMENTS

| | | |
|---|---|---|
| JP | 2008-296618 A | 12/2008 |
| JP | 2010-084867 A | 4/2010 |
| JP | 2014-111962 A | 6/2014 |
| JP | 2014-151835 A | 8/2014 |
| JP | 2014-194251 A | 10/2014 |
| KR | 10-2005-0120981 A | 12/2005 |
| WO | WO 92/17348 A1 | 10/1992 |

* cited by examiner

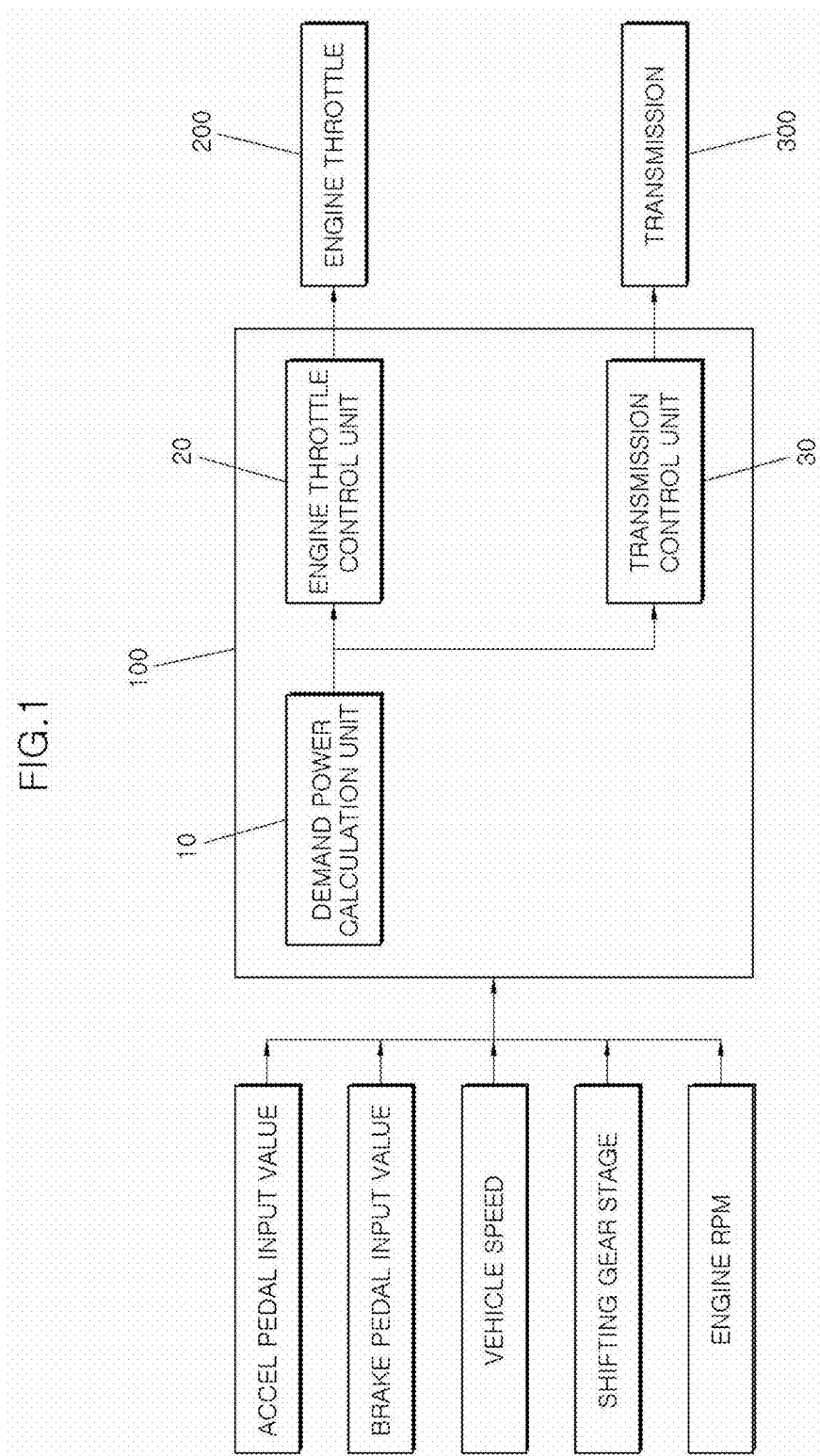

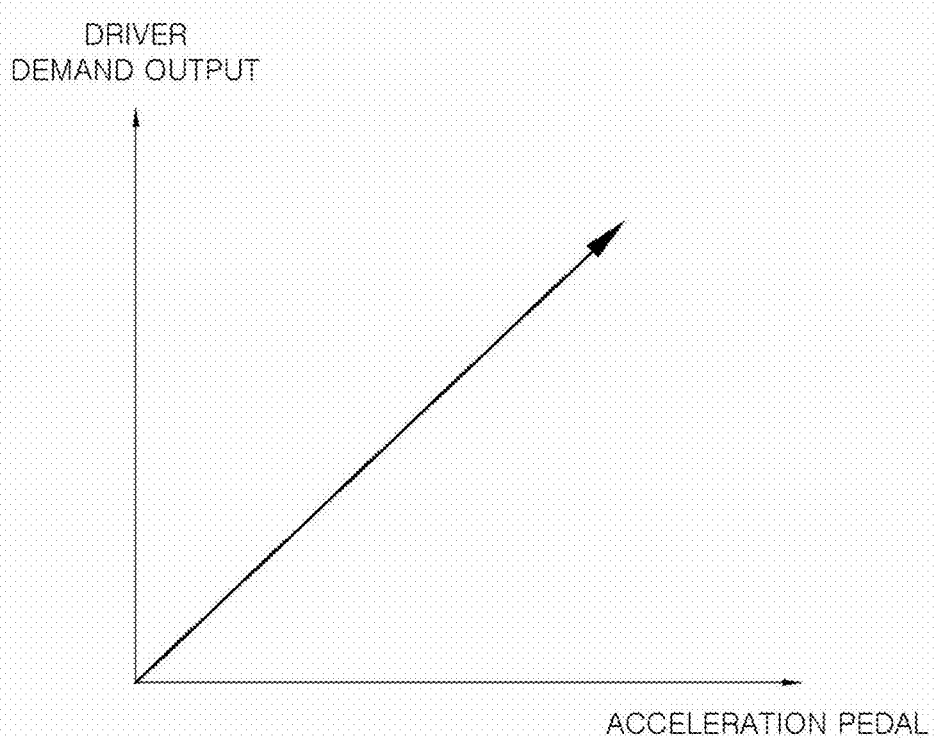

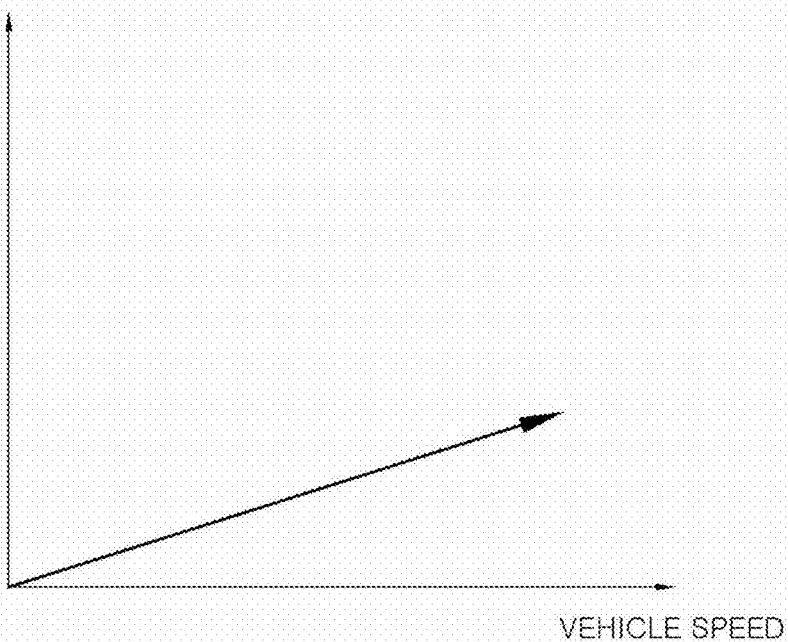

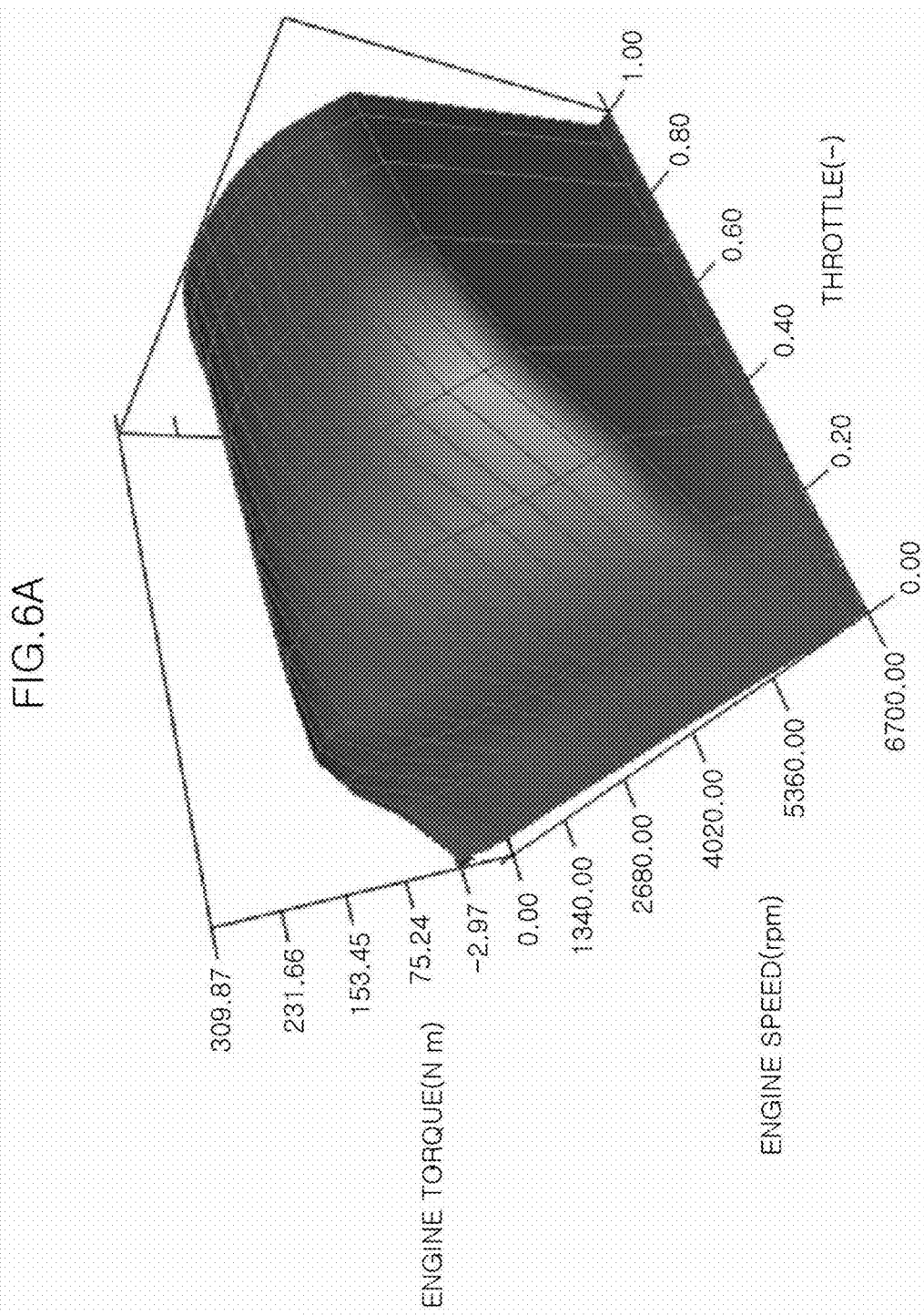

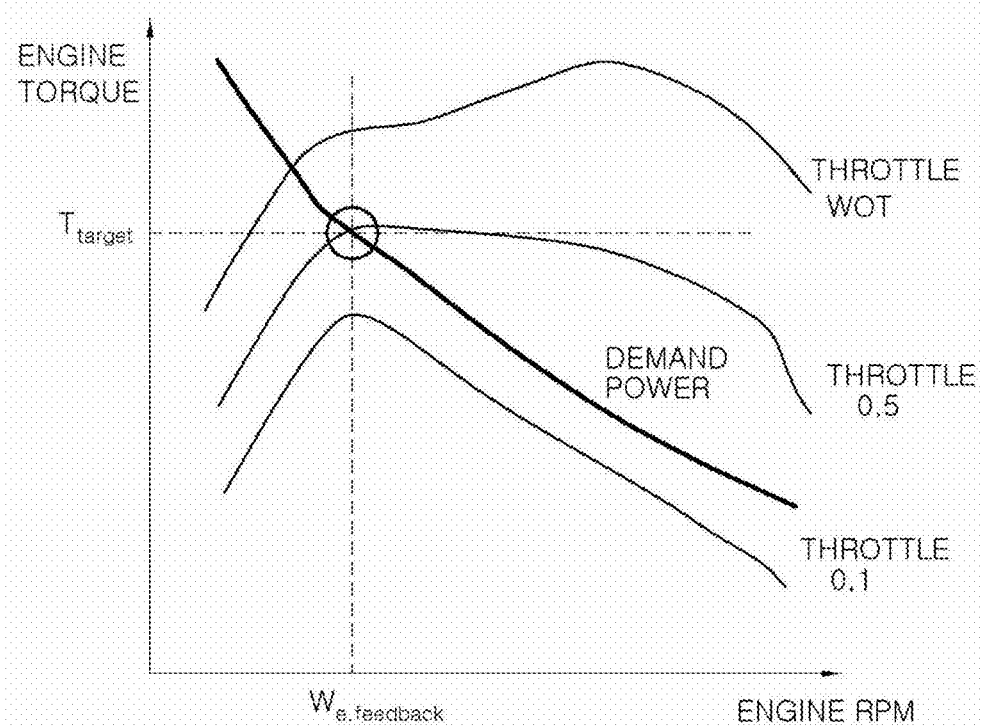

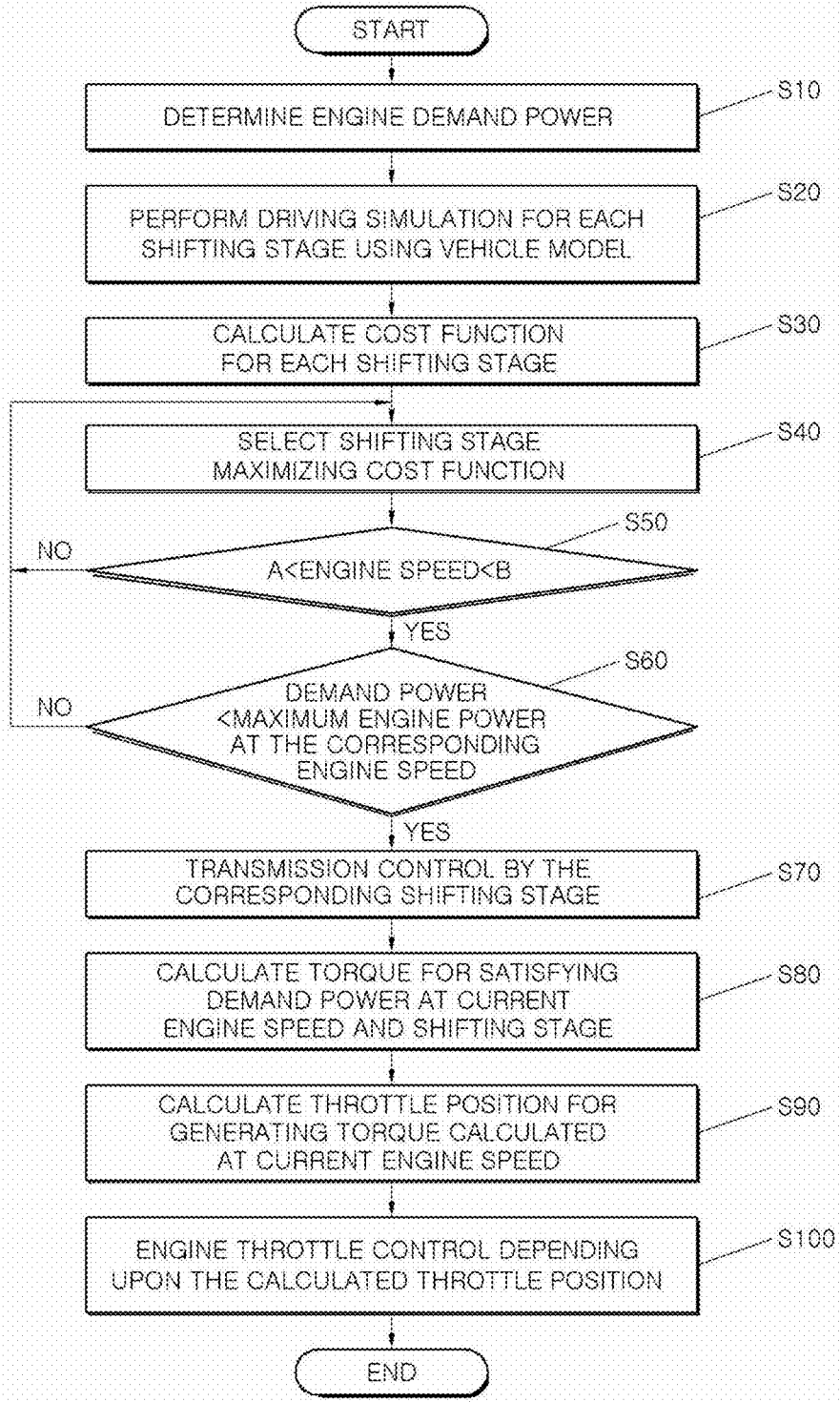

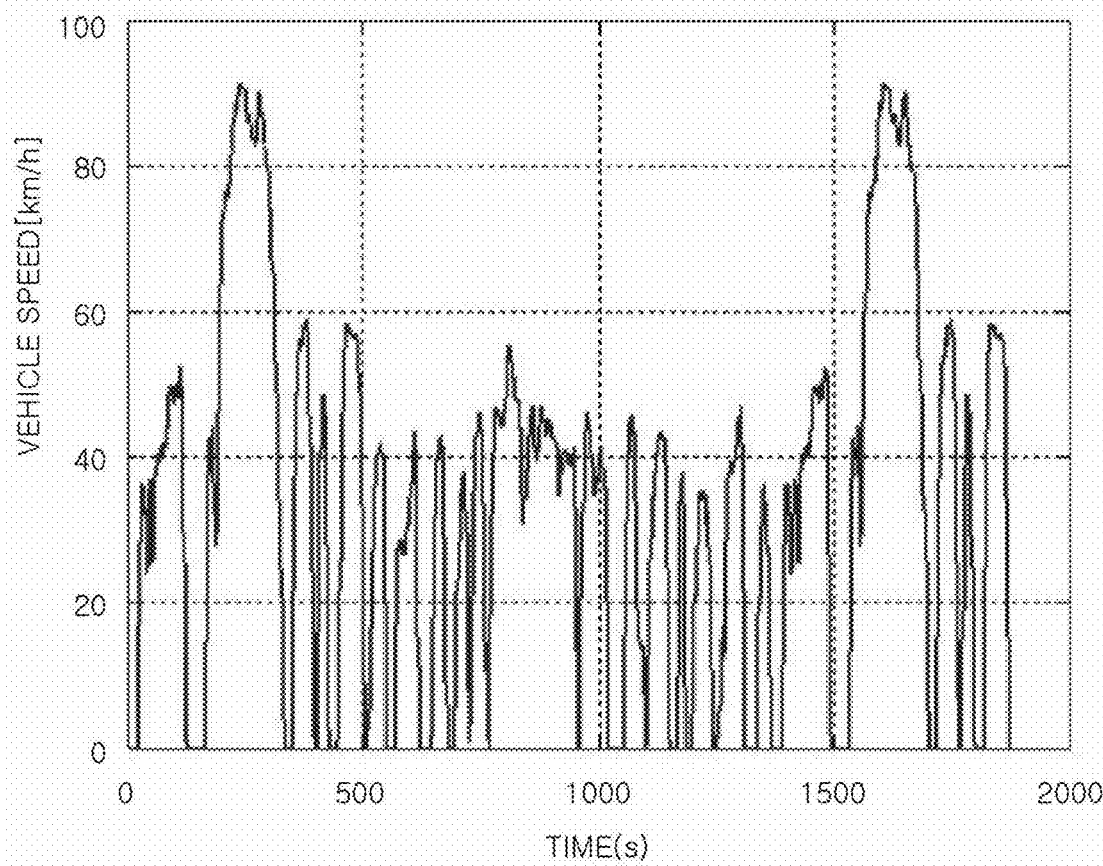

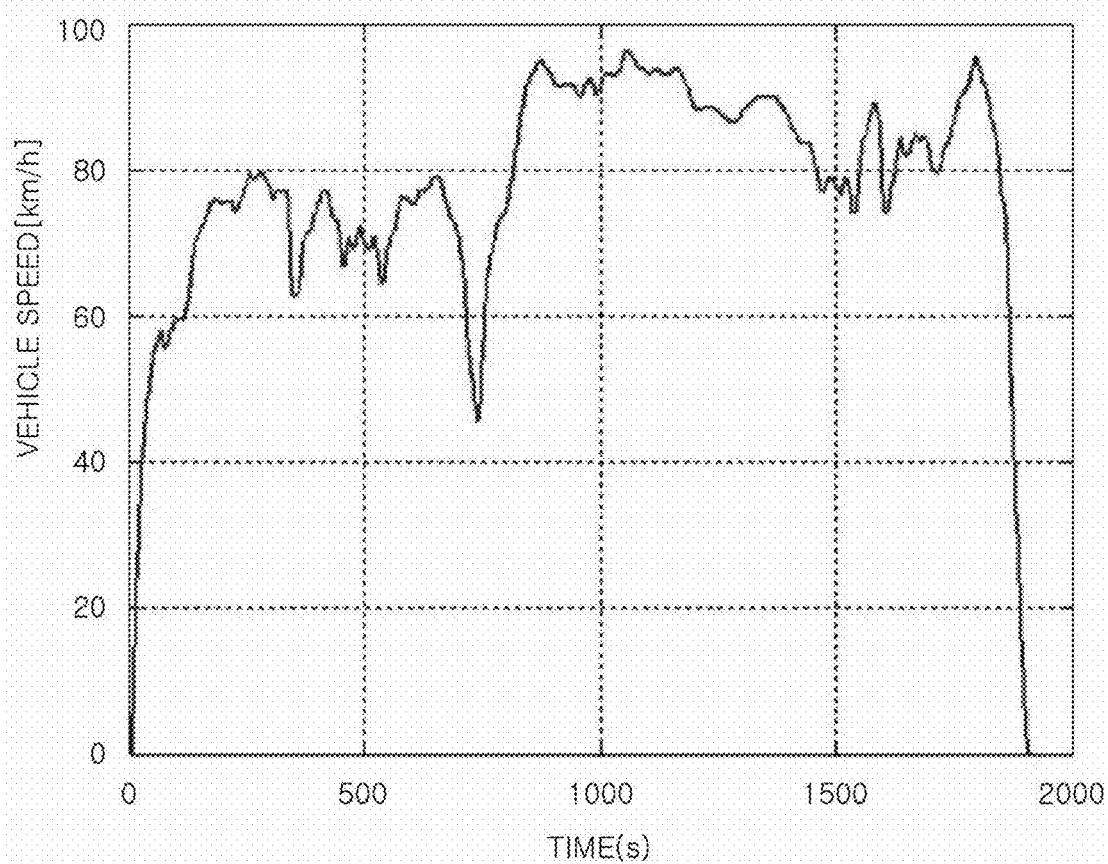

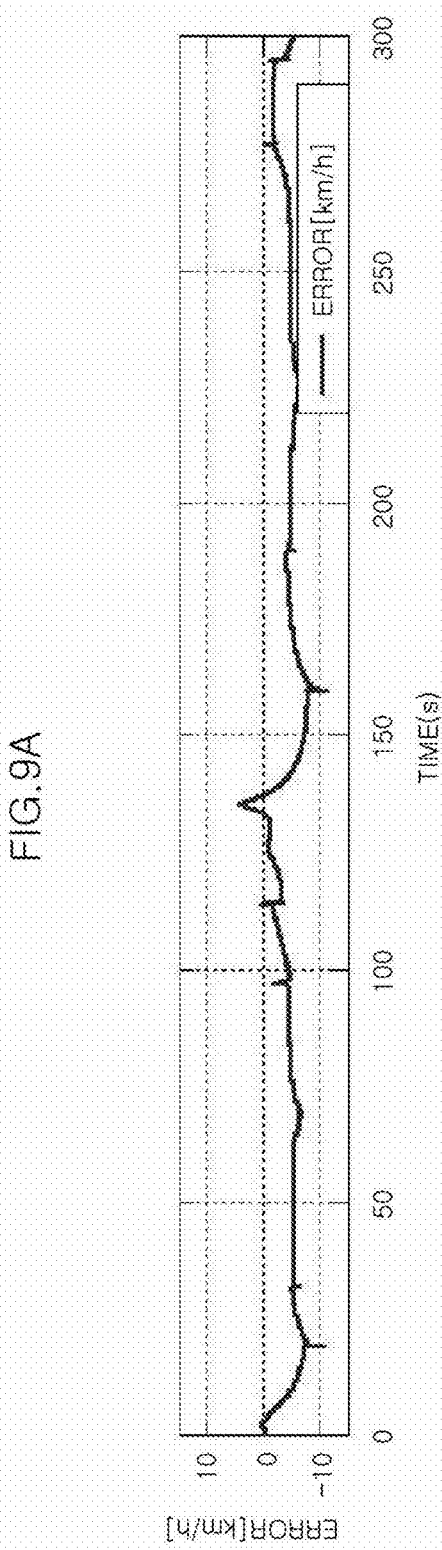

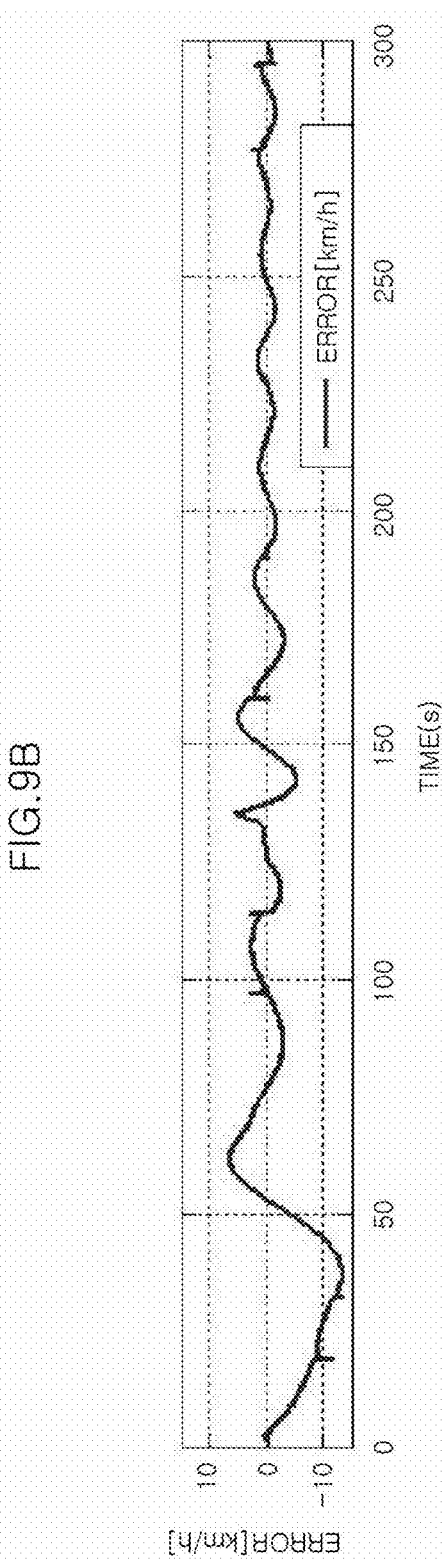

INTEGRATED CONTROL METHOD AND INTEGRATED CONTROLLER OF POWERTRAIN

CROSS-REFERENCE(S) TO RELATED APPLICATIONS

The present application claims priority to Korean Patent Application No. 10-2018-0034644, filed on Mar. 26, 2018, the entire contents of which is incorporated herein for all purposes by this reference.

BACKGROUND OF THE DISCLOSURE

Field of the Disclosure

The present invention relates to an integrated control method and an integrated controller of a powertrain, and more particularly, to an integrated control method and an integrated controller that enhances fuel efficiency and drivability through an integrated control of a powertrain including an engine and an automatic transmission.

Description of Related Art

Generally, a powertrain independently controls an engine and a transmission depending upon an acceleration pedal input of a driver. However, according to the advancement of engine technology and the multi-stages of the transmission, control complexity of the powertrain increases, and thereby it is difficult to optimize the performance of the entire vehicle rather than the performance of each part.

In the conventional transmission, the transmission is performed by a transmission pattern map defined by an acceleration pedal and a vehicle speed. Accordingly, for smooth driving, the shifting may be performed by creating a plurality of maps depending upon various driving states such as flat, up-hill, and down-hill. And, to enhance fuel efficiency, even at the stage when a vehicle speed is low, the engine RPM may be suppressed by shifting to a higher gear stage, but the method cannot cope with the circumstances, for example, a change in road surface inclination, an accel operation of a driver, etc., and the shifting to a low gear stage is performed immediately to reduce the drivability by frequently perform the shifting in the present procedure.

Accordingly, considering these problems, there is a growing need to perform integrated control of the powertrain to optimize the performance of the entire vehicle.

As the technology for solving the problems, it is known that the shifting control of the engine throttle and the transmission is allowed to perform through an integrated control of the powertrain. As its method, a method of optimizing to satisfy the output and the fuel efficiency using a dynamic programming method is known.

A method of performing up-shift/down-shift considering current state such as the depression of the acceleration pedal after determining driving resistance and allowable output through the computation in general driving state it is known.

A method of performing the shifting using a shifting map, and performing the up-shift shifting when an allowable driving force exceeds a specified value by determining the allowable driving force, is known.

Furthermore, methods of determining the braking fuel consumption rate when performing the shifting in the case that the engine RPM or the RPM of the transmission output stage is equal to or greater than a certain value, and determining if the shifting is performed by comparing the above with current braking fuel consumption rate, is known.

A shifting control of the transmission performs a transmission control by creating a shifting map is generally known. However, considering the recent multi-stages of the transmission and the complexity of the engine control technology, it is necessary to have a plurality of maps, and since the conversion of the map is required, the possibility of realization is greatly reduced.

As methods of performing the shifting based on the allowable output and the allowable driving force of the vehicle, it is possible to prevent a frequent gear shifting, and to variably perform the shifting, thus enhancing the drivability and the fuel efficiency. However, the methods perform the shifting considering only the transmission, such that it is possible to give the driver a sense of heterogeneity due to the influence of the engine, and intervention by the driver is required to maintain the same engine output. That is, when the shifting gear stage rises, the change in the gear ratio occurs and thereby the driving resistance applied to the engine increases, such that the intervention by the driver is required for the engine to produce the same output.

It is generally known that it is possible to perform the shifting by comparing the braking fuel consumption rate value which is a fuel indicator to perform the shifting to the direction enhancing the engine fuel efficiency. However, even when the same output of the engine is produced, the driving distance may be changed depending upon the configuration such as a gear stage number and a reduction gear, such that there is the limitation to enhance the fuel efficiency of the entire vehicle based on the braking fuel consumption rate.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a control method and a controller that perform an optimum integrated control of a powertrain based on the vehicle model by converting the driver's intent into the demand power.

In an integrated control method of a powertrain in accordance with an exemplary embodiment of the present invention for solving the problems, to determine an optimum shifting stage of a vehicle, a cost function is applied, the cost function may include a driving distance per fuel consumption amount obtained through the simulation of a vehicle model by use of the demand power of the engine as an input value, and an optimum shifting stage is determined using the cost function to control an engine throttle in addition to controlling a transmission based on the optimum shifting stage.

The integrated control method may include determining the demand power of the engine by summing the output depending upon an acceleration pedal input value and the output for overcoming driving resistance depending upon a vehicle speed; determining the cost function by use of the demand power as the input value; determining the optimum shifting stage that optimizes the determined cost function; and controlling the transmission by the determined optimum shifting stage.

The cost function is the cost function c(n) defined by the following Equation 1, $$c(n)=aF(n)-bD(n) \qquad \text{Equation 1}$$

herein, n refers to the shifting stage, F(n) to the driving distance per fuel consumption amount at the corresponding shifting stage, D(n) to the shifting number required for the corresponding shifting stage, and a and b to proportional constants.

The determining of the cost function receives the demand power of the engine, current engine RPM, and the vehicle speed to obtain a driving distance when the vehicle has driven for a predetermined time with a certain shifting stage through the simulation of a vehicle model and the fuel consumption amount at that time, and the required shifting number, and determines the cost function at the corresponding shifting stage using these values.

The determining of the shifting stage optimizing the determined cost function may include determining the cost function at each shifting stage when performing current shifting stage, an up-shift and a down-shift, and selecting the shifting stage maximizing the determined cost function.

The determining of the cost function may include determining if the rotation speed of the engine at the corresponding shifting stage determined by the simulation is the value that satisfies the range between the maximum rotation speed and the minimum rotation speed of the corresponding engine, and the determining of the shifting stage optimizing the determined cost function selects the shifting stage maximizing the determined cost function among the shifting stages satisfying the range of the RPM.

The determining of the cost function may further include determining if the maximum generation power of the corresponding engine at the rotation speed of the engine determined by the simulation is greater than the demand power of the engine, and the shifting stage maximizing the determined cost function among the shifting stages that the maximum generation power of the corresponding engine at the rotation speed of the corresponding engine is greater than the demand power of the engine is selected, in addition to the fact that the rotation speed of the engine at the corresponding shifting stage determined by the simulation satisfies the range between the maximum rotation speed and the minimum rotation speed of the corresponding engine.

The demand power of the engine is determined based on a predetermined map by the input values of the vehicle speed and the acceleration pedal.

The integrated control method may further include determining a throttle opening of the engine that satisfies the demand power of the engine; and performing a throttle control based on the determined throttle opening; and the determining of the throttle opening of the engine may include determining an engine torque for satisfying the demand power of the engine from the vehicle speed of current vehicle; and determining the throttle opening that can obtain the demand power using a map relating to the engine torque depending upon the engine RPM and the throttle opening.

The integrated control method may further include determining a compensation value for performing a proportional integral (PI) for the difference value between the vehicle speed determined by the simulation of the vehicle model and the vehicle speed of actual vehicle to determine a compensation value for compensating the vehicle speed determined by the simulation of the vehicle model, and compensating the vehicle speed determined by the determined compensation value.

An integrated controller in accordance with an exemplary embodiment of the present invention for solving the problems may include a demand power determination unit for determining the demand power of an engine by summing the output depending upon an acceleration pedal input value and the output for overcoming driving resistance depending upon a vehicle speed; a transmission control unit for using the demand power of the engine determined by the demand power determination unit to determine an optimum shifting stage at which a cost function is maximized using the cost function including a driving distance per fuel consumption amount obtained through the simulation for each vehicle model, and controlling a transmission based on the optimum shifting stage; and an engine throttle control unit for determining a throttle opening of the engine that satisfies the demand power of the engine, and performing a throttle control based on the determined throttle opening.

The cost function is the cost function c(n) defined by the following Equation 1, $$c(n)=aF(n)-bD(n) \qquad \text{Equation 1}$$

herein, n refers to the shifting stage, F(n) to the driving distance per fuel consumption amount at the corresponding shifting stage, D(n) to the shifting number required for the corresponding shifting stage, and a and b to proportional constants.

The transmission control unit may include a cost function determination unit for receiving the demand power of the engine, current engine RPM, and a vehicle speed to obtain a driving distance when a vehicle has driven for a predetermined time with a certain shifting stage through the simulation for a vehicle model and the fuel consumption amount at that time, and the required shifting number, and determining the cost function at the corresponding shifting stage using these values, and an optimization unit for selecting the shifting stage maximizing the cost function determined at each shifting stage when performing current shifting stage, an up-shift, and a down-shift.

The optimization unit determines if the rotation speed of the engine at the corresponding shifting stage determined by the simulation is the value that satisfies the range between the maximum rotation speed and the minimum rotation speed of the corresponding engine, and selects the shifting stage maximizing the determined cost function among the shifting stages satisfying the range of the RPM as an optimum shifting stage.

The optimization unit determines if the maximum generation power of the corresponding engine at the rotation speed of the engine determined by the simulation is greater than the demand power of the engine, and selects the shifting stage maximizing the cost function determined among the shifting stages the maximum generation power of the corresponding engine at the rotation speed of the corresponding engine is greater than the demand power of the engine as the optimum shifting stage, in addition to the fact that the rotation speed of the engine at the corresponding shifting stage determined by the simulation satisfies the RPM range between the maximum rotation speed and the minimum rotation speed of the corresponding engine.

The throttle control unit may include determining an engine torque for satisfying the demand power of the engine from the vehicle speed of current vehicle, and determining the throttle opening that can obtain the demand power using a map relating to the engine torque depending upon the engine RPM and the throttle opening.

The transmission control unit may further include a proportional integral controller for performing a proportional integral (PI) control for the difference value between the vehicle speed determined by the simulation of the vehicle model and the vehicle speed of actual vehicle to determine a compensation value for compensating the vehicle speed determined by the simulation of the vehicle model, and compensating the vehicle speed determined by the determined compensation value.

In the integrated control method and the controller in accordance with the present invention, it is possible to perform the shifting based on the computation values relating to the fuel efficiency and the drivability by the driving state of the vehicle and not the shifting map relating to the acceleration pedal input value and the vehicle speed, thus enhancing the fuel efficiency compared to the conventional shifting method.

In the integrated control method and the controller in accordance with the present invention, it is possible to convert the driver's driving intent into the demand power to perform the control of the engine and the transmission, thus maintaining the drivability while enhancing the fuel efficiency.

In the integrated control method and the controller in accordance with the present invention, the vehicle model is used for the shifting control, such that it is possible to apply the same integrated controller even to a vehicle using the powertrain element, other than a vehicle having a gasoline engine and an automatic transmission by the method that modifies the vehicle model.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a block diagram illustrating the configuration of an integrated controller of a powertrain in accordance with the present invention.

FIG. 2A and FIG. 2B are graphs illustrating the demand output depending upon the driver's intent according to an input value of an acceleration pedal and the output for overcoming the driving resistance depending upon a vehicle speed.

FIG. 6A is a diagram illustrating a map relating to the relationship of a throttle opening, an engine RPM, and an engine torque.

FIG. 6B is a graph relating to the relationship of the throttle opening, the engine RPM, and the engine torque.

FIG. 7 is a flowchart illustrating the integrated control method of the powertrain in accordance with the present invention.

FIG. 8A and FIG. 8B are graphs illustrating a driving cycle for a predetermined time used in the exemplary embodiment of the present invention, respectively.

FIG. 9A is a graph illustrating the difference depending upon the time of actual vehicle speed and the model speed determined in the vehicle model when using the vehicle model that does not apply the proportional integral controller.

FIG. 9B is a graph illustrating the difference depending upon the time of actual vehicle speed and the model speed determined in the vehicle model when using the vehicle model applying the proportional integral controller.

Figure 3:
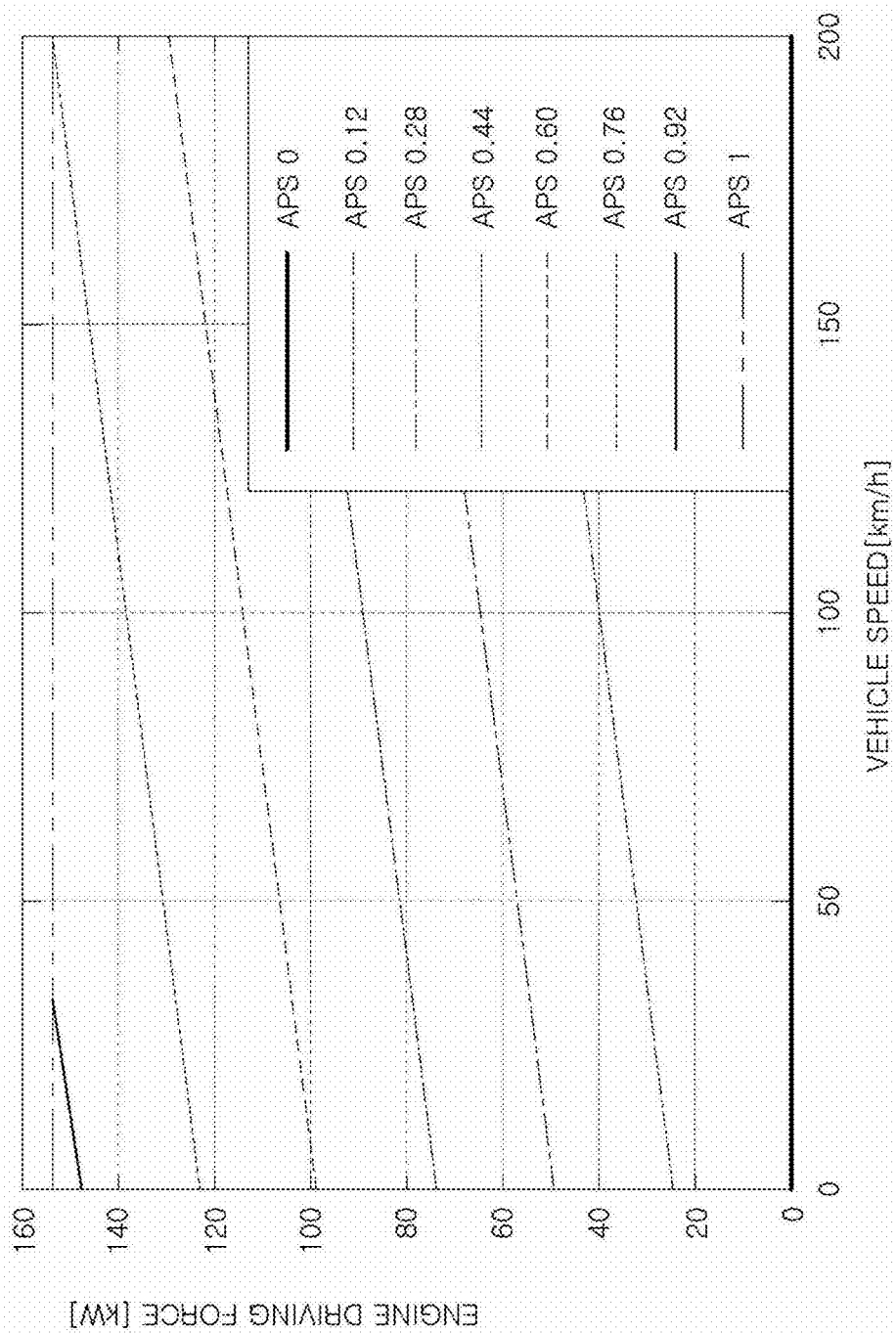
FIG. 3 is a graph illustrating an algorithm for determining the engine demand power depending upon the driver's intent according to the input value of the vehicle speed and the acceleration pedal.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, the exemplary embodiment of the present invention will be described in more detail with reference to the accompanying drawings.

FIG. 1 is a block diagram illustrating the configuration of an integrated controller 100 of a powertrain in accordance with the present invention. As illustrated in FIG. 1, the integrated controller 100 of the powertrain in accordance with an exemplary embodiment of the present invention may include a demand power determination unit 10 for determining the demand power of an engine by summing the driver demand output depending upon an acceleration pedal input value and the output for overcoming driving resistance depending upon a vehicle speed; a transmission control unit 30 for using the demand power of the engine determined by the demand power determination unit to determine an optimum shifting stage at which a cost function is maximized using the cost function including a driving distance per fuel consumption amount obtained through the simulation for each vehicle model, and controlling a transmission based on the optimum shifting stage; and an engine throttle control unit 20 for determining a throttle opening of the engine satisfying the demand power of the engine, and performing a throttle control based on the determined throttle opening. Hereinafter, each configuration forming the integrated controller 100 of the powertrain in accordance with an exemplary embodiment of the present invention will be described in more detail.

<Demand Power Determination Unit>

The demand power determination unit 10 converts the driver's intent into the demand power of the engine, and delivers the information relating to the converted demand power of the engine to the transmission control unit 30 and the engine throttle control unit 20 to control the shifting control and the throttle control based on the demand power.

As illustrated in FIG. 2A, the demand output of the driver increases depending upon the input value of the acceleration pedal by the acceleration pedal operation of the driver (the accel pedal operation amount by the driver). However, as illustrated in FIG. 2B, if the vehicle is accelerated as the input value of the acceleration pedal increases, the driving resistance also increases as the vehicle speed increases. Accordingly, the output required for maintaining the same speed increases as the vehicle speed increases, such that the demand output increases even in the same acceleration pedal input.

Accordingly, to achieve the demand output intended by the driver, the engine demand output is determined and accordingly, the powertrain may be controlled considering the vehicle speed as well as the input value of the acceleration pedal altogether.

Accordingly, the demand power determination unit 10 of the integrated controller 100 in accordance with the exemplary embodiment of the present invention has, as illustrated in FIG. 3, the engine output depending upon the vehicle speed and the acceleration pedal as a type of a map to convert the driver's intent to the engine demand power, and determines the engine output (the demand power of the engine) by the map. Herein, the input value of the acceleration pedal may be obtained by detecting the acceleration pedal operation amount using an accel position sensor disposed to the acceleration pedal of the vehicle. The vehicle speed can sense the rotation of the output shaft of a transmission 300, and may be measured from a vehicle speed sensor that converts it into an electrical pulse signal.

Meanwhile, the map can variously form the output increment rate depending upon the vehicle speed considering the drivability depending upon the maximum output of the engine and the vehicle speed. For example, in a sedan type of the vehicle that the drivability is emphasized, it may be configured to make relatively, moderately the output increment rate in the low-speed section, and to maintain general output increment rate in the medium-high-speed sections. In addition, on the contrary, in a commercial vehicle or SUV, etc. That require a large output in the low-speed section, it is possible to relatively, sharply make the output increment rate in the low-speed section.

<Transmission Control Unit>

Figure 4:
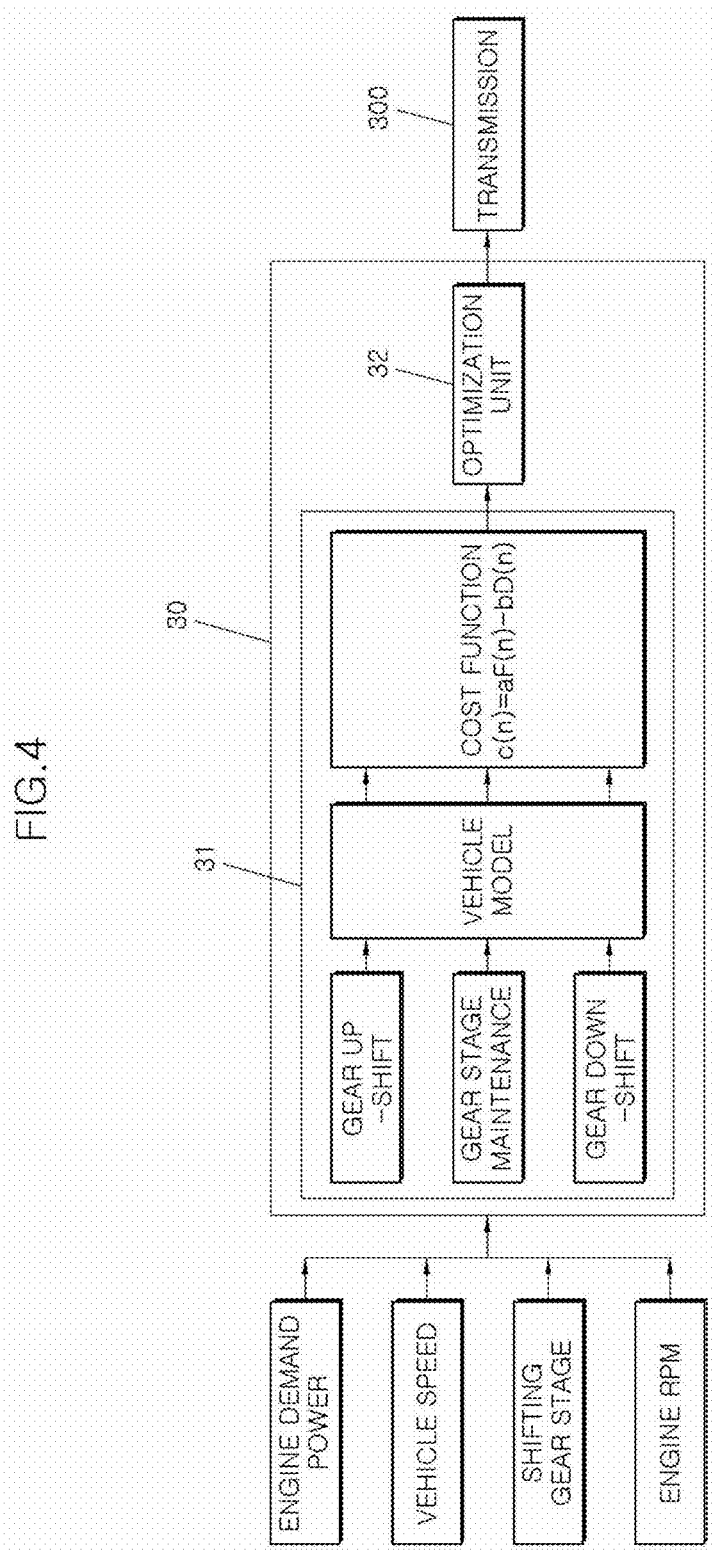
FIG. 4 is a block diagram illustrating a transmission control device among the configuration of the integrated controller of the powertrain in accordance with the present invention.

The transmission control unit 30 may include, as illustrated in FIG. 4, a cost function determination unit 31 for determining a cost function to select an optimum shifting stage and an optimization unit 32 for controlling the transmission 300 by selecting the optimum shifting stage from the determined cost function.

The cost function determination unit 31 receives the demand power of the engine inputted by determining in the demand power determination unit 10, the engine RPM of current vehicle measured from a sensor disposed to the vehicle, and the vehicle speed to determine a fuel consumption amount and a driving distance used in determining the cost function through the simulation of the vehicle model, and determines the cost function at the corresponding shifting stage using these values. Assuming that the tendency of the vehicle speed is maintained for a short time period (e.g., one second) as it is, by use of the demand power of the engine as the input value and performing the driving simulation depending upon each shifting stage for the corresponding time using the vehicle model, the estimated fuel consumption rate and the driving distance at the corresponding shifting stage are determined.

Figure 5:
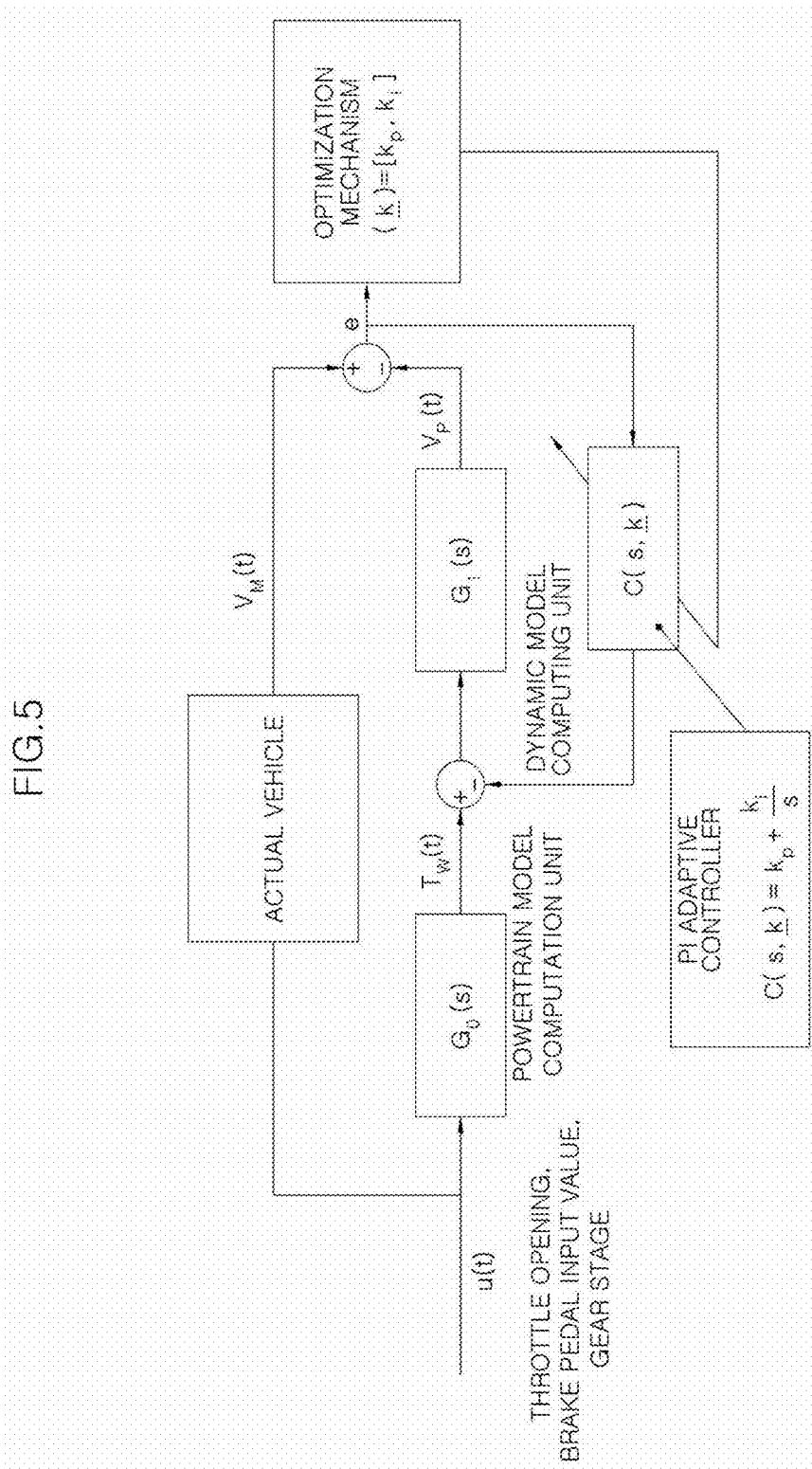
FIG. 5 is a control flowchart illustrating a control logic using a proportional integral controller applied to the transmission control device among the configuration of the integrated controller of the powertrain in accordance with the present invention.

The vehicle model used in the cost function determination unit 31 simulates actual vehicle including physical information affecting the vehicle driving, such as a body weight, a maximum output, a shifting stage, a tire diameter, a gear ratio. And, the vehicle model includes, as illustrated in FIG. 5, a powertrain model computation unit and a dynamic model computation unit.

The powertrain model computation unit stores the powertrain model of the vehicle, and assuming that the tendency of the vehicle speed is maintained as it is, applies the information relating to the demand power of the engine, and the engine RPM of current vehicle, the vehicle speed, and the shifting stage, etc. Inputted from the demand power determination unit 10 to the powertrain model to compute a torque value of the engine at the corresponding shifting stage. The powertrain model includes functional blocks such as an engine, a transmission, and a differential, and the transfer of the data between the functional blocks is performed. For example, the torque value outputted from the transmission is inputted to the differential, and the transmission receives speed feedback from the differential. Furthermore, the powertrain model computation unit computes the driving distance of the virtual vehicle during a predetermined time (e.g., one second) based on the vehicle speed which is fed back from the dynamic model computation unit and the pre-stored vehicle information and the fuel consumption amount at that time.

The dynamic model computation unit stores the dynamic model of the corresponding vehicle, and applies a torque value computed by the powertrain model computation unit to compute the speed of the virtual vehicle and the engine rotation speed during the driving simulation. The dynamic model computation device feedbacks the computed speed to the powertrain model computation unit to be used in the computation of the driving distance of the virtual vehicle and the fuel consumption amount at that time.

When the driving distance at a certain shifting stage and the fuel consumption amount at that time are computed through the driving simulation using the vehicle model, the cost function determination unit 31 determines the cost function including the driving distance per the fuel consumption amount as the parameter using the computed value. The cost function, as a means for selecting an optimum shifting stage, is configured to become an optimum shifting stage targeting a shifting stage that the cost function becomes the maximum value.

The cost function may be configured by including the element relating to the drivability as well as the driving distance per fuel consumption amount that means fuel efficiency. For example, if the shifting number increases, it gives a sense of heterogeneity to a driver, and thereby the drivability is reduced. To reflect it, the cost function used in the cost function determination unit 31 may be defined as the cost function c(n) defined by the following Equation 1.

$$c(n) = aF(n) - bD(n) \qquad \text{Equation 1}$$

Herein, n refers to the shifting stage, F(n) to the driving distance per fuel consumption amount at the corresponding shifting stage, D(n) to the shifting number required for the corresponding shifting stage, and a and b to proportional constants.

In Equation 1, F(n) refers to the driving distance per fuel consumption amount at the corresponding shifting stage(n) and is a factor relating to fuel efficiency, and D(n) refers to the shifting number and is a factor affecting the drivability. In Equation 1, the proportional constants a and b refer to the parameters for determining which factor of the fuel efficiency or the drivability is to be weighted when selecting the optimum shifting stage. If the value increases, the fuel efficiency is regarded as an important factor of the shifting, and if the b value increases, the drivability is relatively regarded as an important factor. For example, if the value increases, although the shifting number increases, the optimum shifting stage is determined to the direction that the fuel efficiency increases, and if the b value increases, although the fuel efficiency slightly increases, the shifting number is reduced and thereby the optimum shifting stage is determined to the direction of increasing the drivability. Accordingly, the cost function determination unit 31 appropriately sets the weighted values a, b depending upon the targeting driving state before determining the cost function.

And, to select the targeting optimum shifting stage, as illustrated in FIG. 4, the cost function determination unit 31 performs the driving simulation using the vehicle model for each of the case that current shifting stage is maintained, the case that the up-shift from the current shifting stage is performed, and the case that the down-shift from the current shifting stage. And, the cost function is determined based on each result of the driving simulation.

If the cost function for each shifting stage is determined, the optimization unit 32 selects an optimum shifting stage using the result value of the cost function. That is, the optimization unit 32 determines the shifting stage becoming the maximum value as the optimum shifting stage by comparing the result value of the cost function determined in each case of the current shifting stage, the up-shift, and the down-shift.

Meanwhile, the driving simulation result that becomes the basis of the cost function at the optimum shifting stage may satisfy the restriction condition depending upon the engine specification of current vehicle. Accordingly, the rotation speed of the engine determined as the result of the driving simulation using the vehicle model at the optimum shifting stage may be in the range between the minimum speed (the speed at the idle state) and the maximum speed that are possible in the corresponding engine. Furthermore, the maximum generation power of the corresponding engine at the rotation speed of the engine determined as the result of the driving simulation may be greater than the demand power of the engine.

As the determined result of the cost function, although the optimum shifting stage has been selected, if the driving simulation result at the corresponding shifting stage does not satisfy the restriction condition, the corresponding shifting stage cannot be selected as the optimum shifting stage. Accordingly, the optimization unit excludes the determined result of the cost function at the corresponding shifting stage, and selects the shifting stage that the result value of the cost function among the remainder shifting stages is maximized as the optimum shifting stage.

As described above, the vehicle model utilizes the physical information related to the vehicle to be simulated, but in the vehicle speed, the error of the vehicle speed between the driving simulation result and actual vehicle due to the loss occurring at the power delivery process or the slip phenomenon of the tire, etc. may be caused. And, if the error of the vehicle speed between the simulation result and actual vehicle is caused, it is difficult to perform an accurate shifting control.

Accordingly, the integrated controller in accordance with an exemplary embodiment of the present invention applies, as illustrated in FIG. 5, a proportional control (PI) adaptive controller to the vehicle model to periodically convert the P and I gain values, thus reducing the determination error between the model and actual vehicle.

More specifically, when determining the vehicle speed through a transfer function ($G_1(S)$) of the dynamic model computation unit via a transfer function ($G_0(S)$) at the powertrain model computation unit, the feedback control is performed so that the determined vehicle speed follows actual vehicle speed. For the present purpose, in the optimization mechanism, the value that subtracts the determined vehicle speed from actual vehicle speed is determined, and the difference value between the determined speeds is provided as the input value of the PI adaptive controller to perform a gain control. The gain control transfer function G(s, k) used in the PI control may be represented as the following Equation 2.

$$C(s,k) = K_p + \frac{K_i}{s} \qquad \text{Equation 2}$$

Herein, the proportional control coefficient $K_p$ and the integral control coefficient $K_i$ may be experimental values that are implemented through the test.

FIG. 9A is a graph illustrating the difference depending upon the time between actual vehicle speed and the model speed determined in the vehicle model when using the vehicle model that does not apply the proportional integral controller, and FIG. 9B is a graph illustrating the difference depending upon the time between actual vehicle speed and the model speed determined in the vehicle model when using the vehicle model applying the proportional integral controller.

As illustrated in FIG. 9A, in a case of using the vehicle model that does not apply the proportional integral controller illustrated in FIG. 5, it may be seen that the difference (error) between actual vehicle speed and the vehicle speed determined by the simulation greatly occurs. Unlike the above, in the exemplary embodiment of FIG. 9B applying the proportional integral controller illustrated in FIG. 5, as the time goes by, the difference between actual vehicle speed and the vehicle speed determined by the simulation is gradually reduced to be converged to 0. Accordingly, by applying the proportional integral controller illustrated in FIG. 5, it may be seen that more accurate shifting control may be performed.

<Engine Throttle Control Unit>

The engine throttle control unit 20 receives the demand power of the engine from the demand power determination unit to perform the function that controls an engine throttle 200 to satisfy the demand power.

For the present purpose, the engine throttle control unit 20 receives, to satisfy the demand power firstly inputted, the engine RPM information measured using an engine RPM measurement sensor such as a crank shaft position sensor from the engine controller, etc, to determine a target torque of the engine required for generating the demand power using Equation 3.

$$P_d = T_t \times W_e \qquad \text{Equation 3}$$

(herein, $P_d$ refers to the demand power, $T_t$ to the target torque, and $W_c$ to the current engine RPM)

If the target torque is determined, as illustrated in FIG. 6A, the map relating to a theory torque amount generating depending upon the engine RPM and the throttle opening that are pre-stored (Equation 4) is converted to make the map for determining the throttle opening depending upon the engine RPM and the torque (Equation 5).

$$T_t = f(\text{Throttle}_t, W_c) \qquad \text{Equation 4}$$

$$\text{Throttle}_t = g(W_c, T_t) \qquad \text{Equation 5}$$

(herein, $\text{Throttle}_t$ refers to the target throttle opening for generating the demand power)

And, using the map made, as illustrated in FIG. 6B, the target torque value corresponding to the demand power and the throttle opening corresponding to current engine RPM are determined. And, the engine throttle is controlled based on the determined target throttle opening.

FIG. 7 is a flowchart illustrating the integrated control method of the powertrain in accordance with the present invention. Hereinafter, the integrated control method of the powertrain in accordance with an exemplary embodiment of the present invention will be described in more detail with reference to FIG. 7.

As illustrated in FIG. 7, firstly, the demand power of the engine is determined through the demand power determination unit 10 (S10). In the S10, a driver's intent is converted into the demand power using the operation amount of the acceleration pedal and the vehicle speed depending upon the acceleration pedal operation of the driver. The determined demand power is inputted to the transmission control unit 30 to be used in selecting the optimum shifting stage.

If the demand power is determined, the cost function determination unit 31 of the transmission control unit 30 receives the demand power value to perform the driving simulation using the vehicle model for each shifting stage (S20). Assuming that the tendency of the speed continues for a very short time, by performing the driving simulation for a short time period (e.g., one second), the fuel consumption amount and the driving distance that become the input values of the cost function are determined. If current shifting stage is maintained as it is, the driving simulation each case of the up-shift and the down-shift is performed independently, and as described above, the shifting number, etc. required for selecting the fuel consumption amount, the driving distance, and the corresponding shifting stage at each shifting stage through the driving simulation are obtained.

Meanwhile, the proportional integral (PI) control for the difference value between the vehicle speed determined by the driving simulation and the vehicle speed of actual vehicle may be performed in parallel. Through the proportional integral control, a compensation value for compensating the vehicle speed determined by the simulation of the vehicle model is determined, and by compensating the vehicle speed determined by the determined compensation value, the vehicle speed determined by the driving simulation follows the vehicle speed of actual vehicle. Thus, it is possible to increase the accuracy upon the shifting control using the vehicle model.

If the input values for determining the cost function are obtained through the driving simulation, the cost function determination unit 31 of the transmission control unit 30 determines the result value of the cost function at each shifting stage using the input value.

In a case of using the cost function of the Equation 1 described above, the cost function determination unit 31 appropriately sets the fuel efficiency weighted value a and the drivability weighted value b of the Equation 1 depending upon the targeting driving state before determining the cost function. And, the cost function is determined by applying the input value of the shifting number required for selecting the fuel consumption amount, the driving distance, and the corresponding shifting stage to the above-described Equation 1.

If the cost function is determined, the optimization unit 32 of the transmission control unit 30 selects the optimum shifting stage from the result value of the determined cost function (S40). Herein, the optimum shifting stage is the shifting stage when the cost function is maximized among each shifting stage.

Meanwhile, the driving simulation result that becomes the basis of the cost function at the optimum shifting stage may satisfy the restriction condition depending upon the engine specification of current vehicle. Accordingly, in S50, it is determined if the rotation speed of the engine determined as the result of the driving simulation using the vehicle model at the optimum shifting stage selected in the S40 is in the range between the minimum speed A (the speed in the idle state) and the maximum speed B that are possible at the corresponding engine (S50). If the rotation speed of the engine at the optimum shifting stage exceeds the corresponding speed range, the result at the S40 is excluded, and the shifting stage that the result value of the cost function is maximized among the remaining shifting stages is selected again as the optimum shifting stage.

Meanwhile, although the rotation speed of the engine at the optimum shifting stage satisfies a predetermined speed range, to actually, stably output the demand power, the maximum generation power of the corresponding engine at the rotation speed of the corresponding engine may be greater than the demand power of the engine by a certain level. Accordingly, the maximum generation power of the corresponding engine at the rotation speed of the corresponding engine is compared with the demand power of the engine (S60), if the maximum generation power of the corresponding engine at the rotation speed of the corresponding engine is equal to or greater than the demand power of the engine by a predetermined level, the result at the S40 is excluded, and the shifting stage that the result value of the cost function among the remaining shifting stages is maximized is selected again as the optimum shifting stage.

If it is determined that the optimum shifting stage satisfies the restriction condition in the S50 and S60, the transmission control unit 30 controls the transmission 300 based on the optimum shifting stage. Thus, according to the exemplary embodiment of the present invention, it is possible to perform the shifting control in the direction maximizing the cost function at every moment upon the vehicle driving, thus achieving an effect of enhancing the fuel efficiency.

In the integrated control method in accordance with the present invention, when the shifting control begins by selecting the optimum shifting stage, the control of the engine throttle 200 based on the demand power determined by the S10 is performed together.

For the present purpose, the engine throttle control unit 20 receives the demand power of the engine from the demand power determination unit 10 and receives the engine RPM information from the engine controller, etc. using the engine RPM measurement sensor such as the crank shaft position sensor to determine the target torque for satisfying the demand power (S80).

If the target torque is determined, the target torque corresponding to the demand power and the throttle opening corresponding to current engine RPM based on the pre-stored map are determined (S90). And, the engine throttle is controlled based on the determined target throttle opening (S100). Thus, by converting the driver's intent into the demand power and controlling the engine throttle 200 to achieve the converted demand power, it is possible to achieve an effect of enhancing the drivability.

Embodiment

Hereinafter, the result of comparing the exemplary embodiment that applies the integrated controller of the present invention to embody the driving cycle with the comparative example applying the conventional control method for the same driving cycle will be described in detail.

To verify the performance of the integrated controller applying the present invention, the driving simulations of the vehicle model applying the integrated controller and the vehicle model that does not apply the integrated controller with respect to the driving cycle illustrated in FIG. 8A and the driving cycle illustrated in FIG. 8B were performed.

Table 1 below represents an average speed, a maximum speed, a driving time, and total driving distance in the driving cycle illustrated in FIG. 8A, and Table 2 represents an average speed, a maximum speed, a driving time, and total driving distance in the driving cycle illustrated in FIG. 8B. As illustrated in FIG. 8A, FIG. 8B, Table 1, and Table 2, the driving cycle of FIG. 8A is the driving cycle that represents the city driving mode that the average speed is relatively low, the driving time is relatively long, and the change of the vehicle speed is frequent, and FIG. 8B is the driving cycle that represents the highway driving mode that the average speed is relatively high, the driving time is relatively short, and the change of the vehicle speed is relatively less.

TABLE 1

| Average Speed | Maximum Speed | Driving Time | Total Driving Distance |
|---|---|---|---|
| 34.11 km/h | 91.2 km/h | 1874 s | 17.66 km |

TABLE 2

| Average Speed | Maximum Speed | Driving Time | Total Driving Distance |
|---|---|---|---|
| 77.58 km/h | 96.4 km/h | 765 s | 16.45 km |

Table 3 and Table 4 are the results that perform the driving simulations of the vehicle model applying the integrated controller and the vehicle model that does not apply the integrated controller with respect to the driving cycle illustrated in FIG. 8A. The vehicle model used in the driving simulation was the vehicle that has 150 kW gasoline engine and 6-stage gear automatic transmission. As illustrated in Table 3, the exemplary embodiment applying the integrated controller relatively a lot utilizes a higher-stage gear compared to the comparative example that does not apply the integrated controller. Accordingly, as illustrated in Table 4, it may be seen that the shifting number has increased somewhat compared to the comparative example but the fuel efficiency has increased compared to the comparative example.

TABLE 3

| | | Gear stage number | | | | | |
|---|---|---|---|---|---|---|---|
| | | 1 | 2 | 3 | 4 | 5 | 6 |
| Occupied percentage | Comparative example | 36.40% | 21.54% | 28.12% | 4.61% | 9.33% | 0% |
| | Embodiment | 22.94% | 6.8% | 4.16% | 51.5% | 6.67% | 7.93% |

TABLE 4

| | Fuel efficiency | Average engine torque | Average engine speed | Gear efficiency | Shifting number |
|---|---|---|---|---|---|
| Comparative Example | 17.1 km/L | 24.54 Nm | 1769 rpm | 0.9354 | 100 |
| Embodiment | 20.0 km/L | 36.38 Nm | 1319 rpm | 0.9462 | 242 |

Table 5 and Table 6 are the results that perform the driving simulations of the vehicle model applying the integrated controller and the vehicle model that does not apply the integrated controller with respect to the driving cycle illustrated in FIG. 8B. The vehicle model was used with the same model as Table 3 and Table 4. As in the examples of Table 3 and Table 4, the exemplary embodiment applying the integrated controller relatively a lot utilizes a higher-stage gear compared to the comparative example that does not apply the integrated controller, and thereby the shifting number has increased somewhat compared to the comparative example but the fuel efficiency has increased compared to the comparative example. Furthermore, it may be seen that in the driving cycle illustrated in FIG. 8B, the difference of the shifting number between the exemplary embodiment and the comparative example is relatively small compared to the example applying the driving cycle of FIG. 8A. That is, it may be seen that the reduction in the drivability is less in the driving cycle of FIG. 8B.

TABLE 5

| | | Gear stage number | | | | | |
|---|---|---|---|---|---|---|---|
| | | 1 | 2 | 3 | 4 | 5 | 6 |
| Occupied percentage | Comparative example | 2.40% | 0.91% | 4.51% | 37.58% | 54.60% | 0% |
| | Embodiment | 22.94% | 6.8% | 4.16% | 51.5% | 6.67% | 7.93% |

TABLE 6

| | Fuel efficiency | Average engine torque | Average engine speed | Gear efficiency | Shifting number |
|---|---|---|---|---|---|
| Comparative Example | 26.6 km/L | 44.57 Nm | 2146 rpm | 0.9654 | 10 |
| Embodiment | 29.2 km/L | 60.32 Nm | 1629 rpm | 0.9866 | 14 |

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated control method of a powertrain, the method comprising:
   determining a demand power of an engine by summing an output depending upon an acceleration pedal input value and an output for overcoming driving resistance depending upon a vehicle speed,
   determining a cost function by use of the demand power as an input value, wherein the cost function includes a driving distance per fuel consumption amount obtained through a simulation of a vehicle model as a parameter by use of the demand power of the engine as the input value thereto,
   determining an optimum shifting stage of a vehicle, by optimizing the determined cost function to control an engine throttle and to control a transmission based on the optimum shifting stage, and
   controlling the transmission by the determined optimum shifting stage.

2. The integrated control method of the powertrain of claim 1, wherein the cost function is a cost function c(n) defined by the following Equation, $$c(n) = aF(n) - bD(n)$$

wherein the n refers to a shifting stage, the F(n) to the driving distance per fuel consumption amount at a corresponding shifting stage, the D(n) to a shifting number required for the corresponding shifting stage, and the a and the b to proportional constants.

3. The integrated control method of the powertrain of claim 2,
   wherein the determining of the cost function includes receiving the demand power of the engine, current engine RPM, and the vehicle speed to obtain a driving distance when the vehicle has driven for a predetermined time by a predetermined shifting stage through the simulation of the vehicle model, a fuel consumption amount at the predetermined time, and a required shifting number, and determines the cost function at the corresponding shifting stage using the driving distance, the fuel consumption amount, and the required shifting number.

4. The integrated control method of the powertrain of claim 3, further including:
   determining a compensation value for compensating the vehicle speed determined by the simulation of the vehicle model by performing a proportional integral (PI) control for a difference value between the vehicle speed determined by the simulation of the vehicle model and the vehicle speed of the vehicle, and compensating the vehicle speed determined by the determined compensation value.

5. The integrated control method of the powertrain of claim 1, wherein the determining of the optimum shifting stage optimizing the determined cost function includes determining the cost function at each shifting stage when performing a current shifting stage, an up-shift and a down-shift, and selecting a shifting stage maximizing the determined cost function.

6. The integrated control method of the powertrain of claim 5, wherein the determining of the cost function at each shifting stage includes:
   determining when a rotation speed of the engine at the corresponding shifting stage determined by the simulation is a value that satisfies a predetermined range between a maximum rotation speed and a minimum rotation speed of the engine, and
   wherein the determining of the optimum shifting stage optimizing the determined cost function selects the shifting stage maximizing the determined cost function among shifting stages satisfying the predetermined range.

7. The integrated control method of the powertrain of claim 6,
   wherein the determining of the cost function at each shifting stage further includes determining when a maximum generation power of the engine at the rotation speed of the engine determined by the simulation is greater than the demand power of the engine, and
   wherein the shifting stage maximizing the determined cost function among the shifting stages that the maximum generation power of the engine at the rotation speed of the engine is greater than the demand power of the engine is selected, in addition to a fact that the rotation speed of the engine at the corresponding shifting stage determined by the simulation satisfies the predetermined range between the maximum rotation speed and the minimum rotation speed of the engine.

8. The integrated control method of the powertrain of claim 1, wherein the demand power of the engine is determined based on a predetermined map by the vehicle speed and an input value of the acceleration pedal.

9. The integrated control method of the powertrain of claim 1, further including determining a throttle opening of the engine that satisfies the demand power of the engine; and performing a throttle control based on the determined throttle opening, wherein the determining of the throttle opening of the engine includes:

determining an engine torque for satisfying the demand power of the engine from the vehicle speed of the vehicle; and determining the throttle opening that obtains the demand power using a map relating to the engine torque depending upon an engine revolution per minute (RPM) and the throttle opening.

10. An integrated controller of a powertrain, the integrated controller comprising:

a demand power determination unit for determining a demand power of an engine by summing an output depending upon an acceleration pedal input value and an output for overcoming driving resistance depending upon a vehicle speed;

a transmission control unit for determining, by use of the demand power of the engine determined by the demand power determination unit, an optimum shifting stage in which a cost function is maximized using the cost function including a driving distance per fuel consumption amount obtained through a simulation for a vehicle model as a parameter, and controlling a transmission based on the optimum shifting stage; and an engine throttle control unit for determining a throttle opening of the engine that satisfies the demand power of the engine, and performing a throttle control based on the determined throttle opening, wherein the throttle control unit is configured to determine an engine torque for satisfying the demand power of the engine from the vehicle speed of the vehicle, and to determine the throttle opening that obtains the demand power using a map relating to the engine torque depending upon an engine revolution per minutes (RPM) and the throttle opening.

11. The integrated controller of the powertrain of claim 10, wherein the cost function is a cost function c(n) defined by the following Equation, $c(n)=aF(n)-bD(n)$ wherein, the n refers to a shifting stage, the F(n) to the driving distance per fuel consumption amount at a corresponding shifting stage, the D(n) to a shifting number required for the corresponding shifting stage, and the a and the b to proportional constants.

12. The integrated controller of the powertrain of claim 11, wherein the transmission control unit includes:

a cost function determination unit for receiving the demand power of the engine, a current engine RPM, and the vehicle speed to obtain a driving distance when the vehicle has driven for a predetermined time by a predetermined shifting stage through the simulation for the vehicle model, a fuel consumption amount at the predetermined time, and a required shifting number, and determining the cost function at the corresponding shifting stage using the driving distance, the fuel consumption amount, and the required shifting number, and an optimization unit for selecting a shifting stage maximizing the cost function determined at each shifting stage when performing a current shifting stage, an up-shift, and a down-shift.

13. The integrated controller of the powertrain of claim 12, wherein the optimization unit determines when a rotation speed of the engine at the corresponding shifting stage determined by the simulation is a value that satisfies a predetermined range between a maximum rotation speed and a minimum rotation speed of the engine, and wherein the optimization unit selects the shifting stage that maximizes the determined cost function among the shifting stages satisfying the predetermined range as the optimum shifting stage.

14. The integrated controller of the powertrain of claim 13, wherein the optimization unit determines when a maximum generation power of the engine at the rotation speed of the engine determined by the simulation is greater than the demand power of the engine, and wherein the optimization unit selects the shifting stage maximizing the determined cost function among the shifting stages that the maximum generation power of the engine at the rotation speed of the engine is greater than the demand power of the engine as the optimum shifting stage, in addition to a fact that the rotation speed of the engine at the corresponding shifting stage determined by the simulation satisfies the predetermined range between the maximum rotation speed and the minimum rotation speed of the engine.

15. The integrated controller of the powertrain of claim 12, wherein the transmission control unit further includes a proportional integral controller configured for performing a proportional integral (PI) control for a difference value between the vehicle speed determined by the simulation of the vehicle model and the vehicle speed of vehicle to determine a compensation value for compensating the vehicle speed determined by the simulation of the vehicle model, and compensating the vehicle speed determined by the determined compensation value.

* * * * *